April 7, 1942.  H. F. HERMAN  2,279,196
COOKING DEVICE
Filed Oct. 6, 1939  5 Sheets-Sheet 2

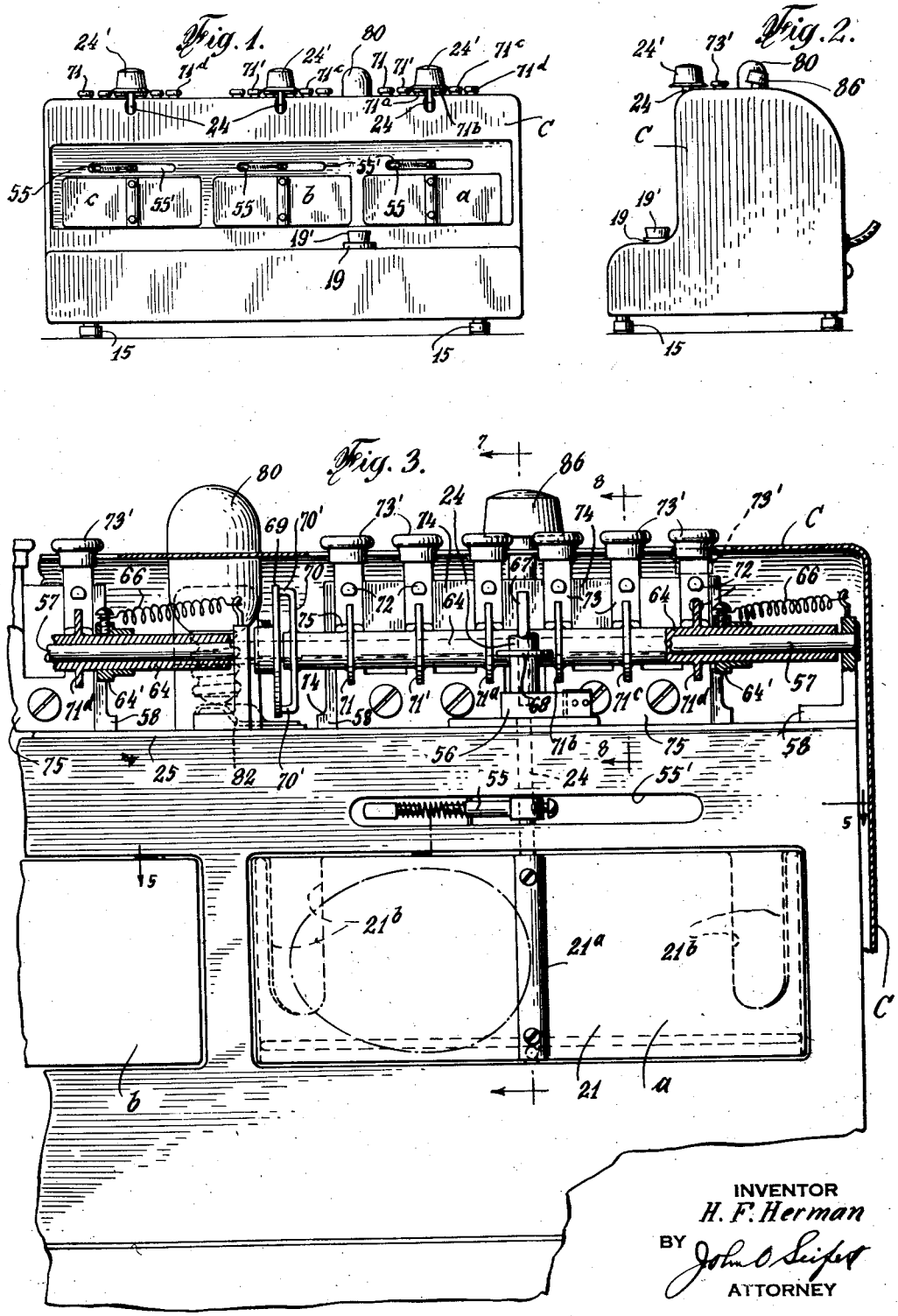

INVENTOR
H. F. Herman
BY John O. Seifert
ATTORNEY

April 7, 1942. H. F. HERMAN 2,279,196
COOKING DEVICE
Filed Oct. 6, 1939 5 Sheets-Sheet 4

INVENTOR
H. F. Herman
BY John O. Seifert
ATTORNEY

April 7, 1942.  H. F. HERMAN  2,279,196
COOKING DEVICE
Filed Oct. 6, 1939  5 Sheets-Sheet 5
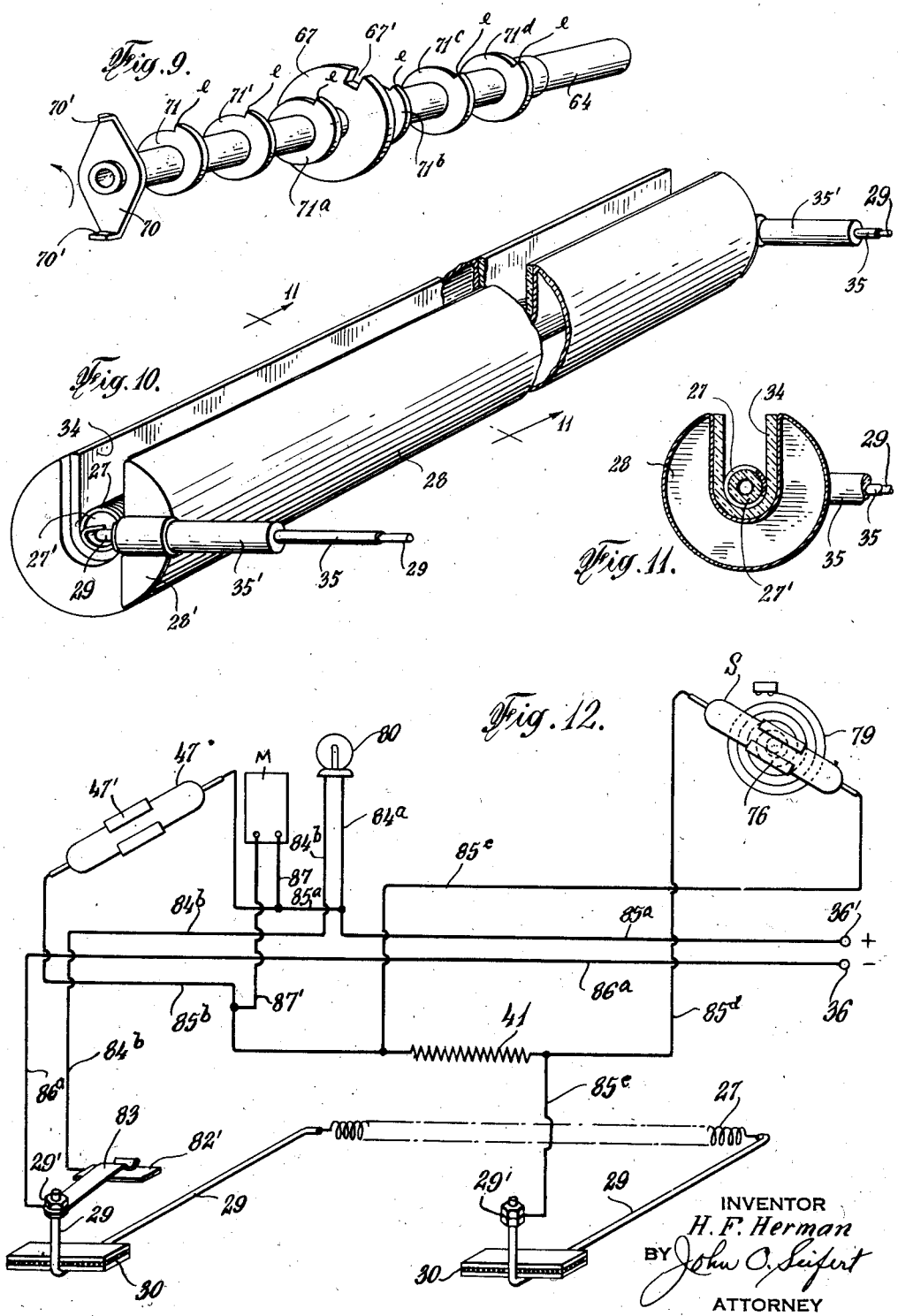

Patented Apr. 7, 1942

2,279,196

UNITED STATES PATENT OFFICE 2,279,196

COOKING DEVICE

Henry F. Herman, Rye, N. Y., assignor of one-half to Herbert S. Wetzler, New York, N. Y.

Application October 6, 1939, Serial No. 298,162

8 Claims. (Cl. 219—38)

This invention relates to a cooking device and while it is particularly adapted for use in cooking eggs it may be utilized for cooking other articles.

In egg cooking devices it is the practice to provide a water container and an egg support mounted relative to the water container and normally urged upwardly to position so that it will not engage in the water in the container and adapted to be moved to and releasably retained in position with an egg or eggs supported thereby immersed in the water in the container, and means are provided to releasably retain the egg support in said position and automatically operative at a predetermined interval after the support has been moved to said position to release the support and permit it to be actuated to position with the egg out of the water in the container. In devices of this character it is necessary to provide means to heat the water in the container to substantially the boiling point. This is usually effected by steam or electrically. When steam is utilized for this purpose it is necessary to provide a constant steam supply of a sufficiently high temperature to bring the water to the boiling point, and when the water is electrically heated it requires a large amount of electric current, especially so when the water is maintained substantially at the boiling point during the period no eggs are cooked, which is the practice in some uses of such devices.

It is an object of the invention to provide an improved steam cooker wherein eggs or other articles to be cooked, or a container containing the material to be cooked, is subjected directly to the action of steam.

It is a further object of the invention to provide an improved steam generator including a water container, an electric heating element and means to support and automatically position and maintain the heating element in position with only a portion thereof engaging in the water in the container and cause the heating element to instantly generate steam when the heating element is connected in circuit with a source of electric energy.

It is another object of the invention to provide in a cooker of this character improved selectively settable time controlled means for effecting cooking of articles for different selected predetermined intervals of time.

A further object of the invention is to provide a steam cooker and means to regulate the generating of steam and maintain the steam at a predetermined temperature.

Other objects and advantages of the invention will hereinafter appear.

In the drawings accompanying and forming a part of this application, Figure 1 is a front elevation of a cooking device embodying the invention.

Figure 2 is a side elevation looking at the left of Figure 1.

Figure 3 is a front elevational view of the right hand end portion of Figure 1, on an enlarged scale, and a portion of an enclosing casing being broken away and shown in section to illustrate parts within the same and parts of the mechanism are also shown in section.

Figure 9 is a perspective view of a stop disk carrying shaft constituting part of settable time controlled means for effecting cooking of articles for different selected predetermined intervals or periods of time.

Figure 10 is a perspective view, partly in section, of float means for buoyantly supporting an electric heating element with only a portion thereof engaged in the water in a tank to instantly convert the water into steam.

Figure 11 is a sectional view taken on the line 11—11 of Figure 10; and

Figure 12 is a diagrammatic view showing the electrical connections of the different parts of the cooking apparatus.

Figure 4:
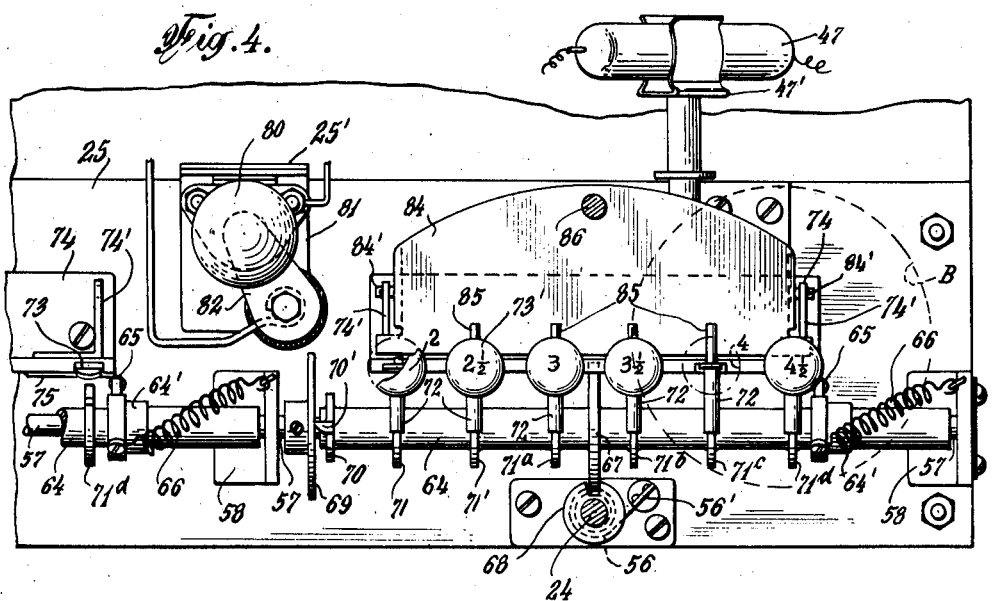
Figure 4 is a plan view looking at the top of Figure 3.

An embodiment of the invention is shown in the drawings in a multiple cooking device in that it is provided with cooking chambers in any one of which chambers articles may be cooked for different intervals or periods of time independently of cooking articles in the other chambers, or the articles may be cooked simultaneously in two or all of the three chambers and the articles in each chamber cooked for different intervals or periods of time.

Figures 7, 8:
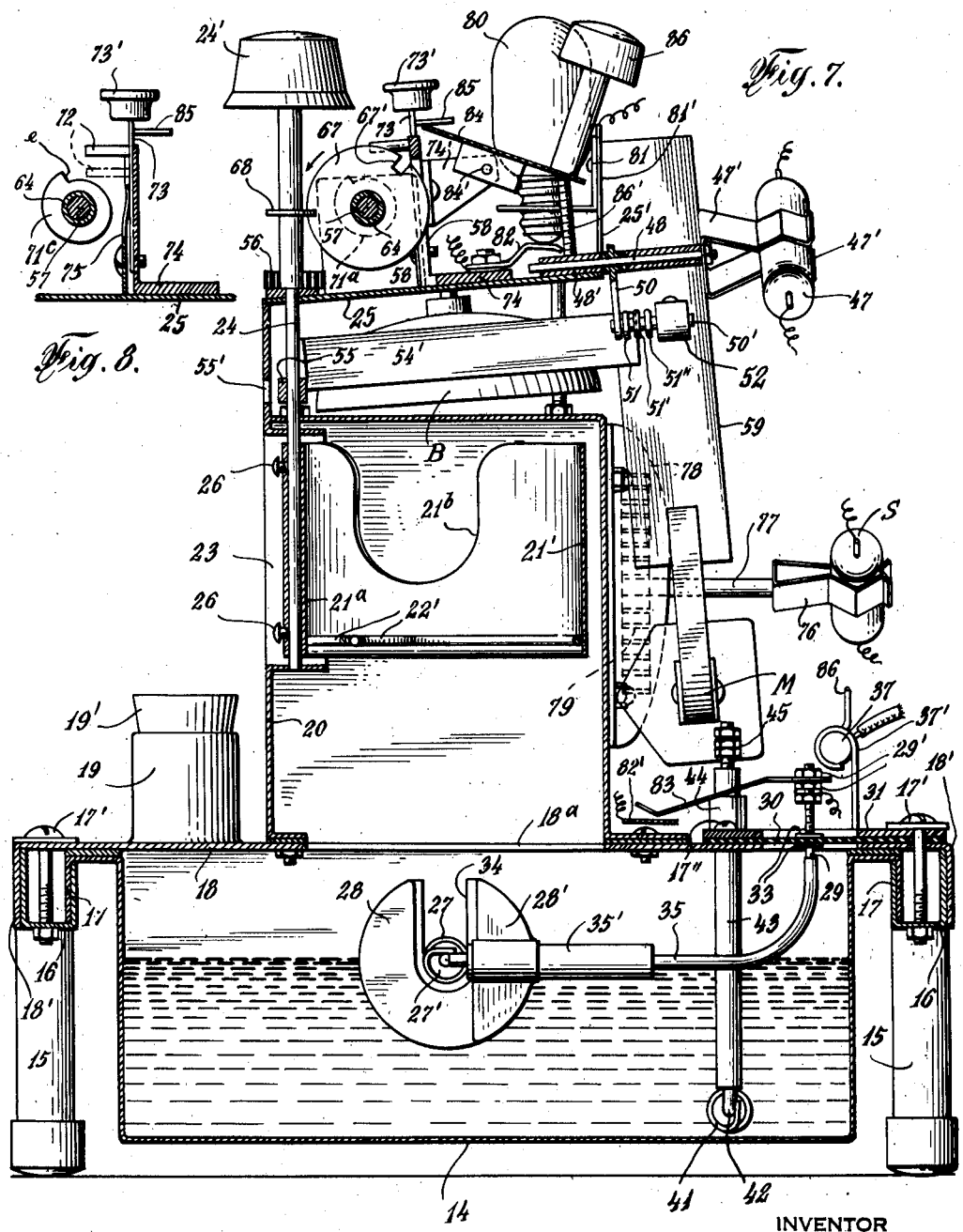
Figure 7 is a cross sectional view taken on the line 7—7 of Figure 3.
Figure 8 is a sectional view taken on the line 8—8 of Figure 3.

In carrying out the invention there is provided a container 14 of non-conducting material of rectangular form in plan and in cross section and open at the top to contain liquid, such as water. The container is supported by suspending the same from feet 15 disposed adjacent each corner of the container by means of rails 16 of U shape in cross section extending in inverted position longitudinally of the container and secured at the opposite ends upon the feet 15. To suspend the container from the rail 16 the side walls of the container are flanged outwardly and downwardly, as at 17, with the downwardly extending portion engaging in the rails 16 in juxtaposed relation to a side wall thereof, as shown in Figure 7. A plate 18 of greater width than the container is engaged upon the open top of the container, the longitudinal marginal portions of the plate being flanged laterally and engaged at the outer side walls of the rails 16, as at 18', and secured in position by screws or bolts 17, as shown. The plate is provided with an opening having a neck member 19 disposed relative thereto through which water is filled into the container, the neck member being closed by a closure, such as a stopper 19'. The plate 18 has an opening 18ª intermediate the sides and extending longitudinally of the plate, and a casing 20 of rectangular form and open at the bottom is mounted on the plate 18 in superposed relation to the container 14 with the bottom of the casing in communication with the top of the container through the opening 18ª and through which opening steam from the container is received in the chamber in the casing 20.

Steam constitutes the cooking medium and to cook articles, such as eggs, means are provided to support the same in the casing within the range of the cooking medium or at the exterior of the casing chamber and out of the range of the cooking medium. As stated, the device illustrated is adapted to cook one or more of three articles independently, or three articles simultaneously. For this purpose three carriers are provided for articles to be cooked, as shown at a, b and c in Figure 1, and three independently settable means are provided, one to be associated with each of the carriers to effect actuation of the carriers and whereby the articles in the different carriers may be cooked for different predetermined intervals or periods of time. As the carrier and said settable means are of the same arrangement, description of one will suffice for all of them.

Figure 5:
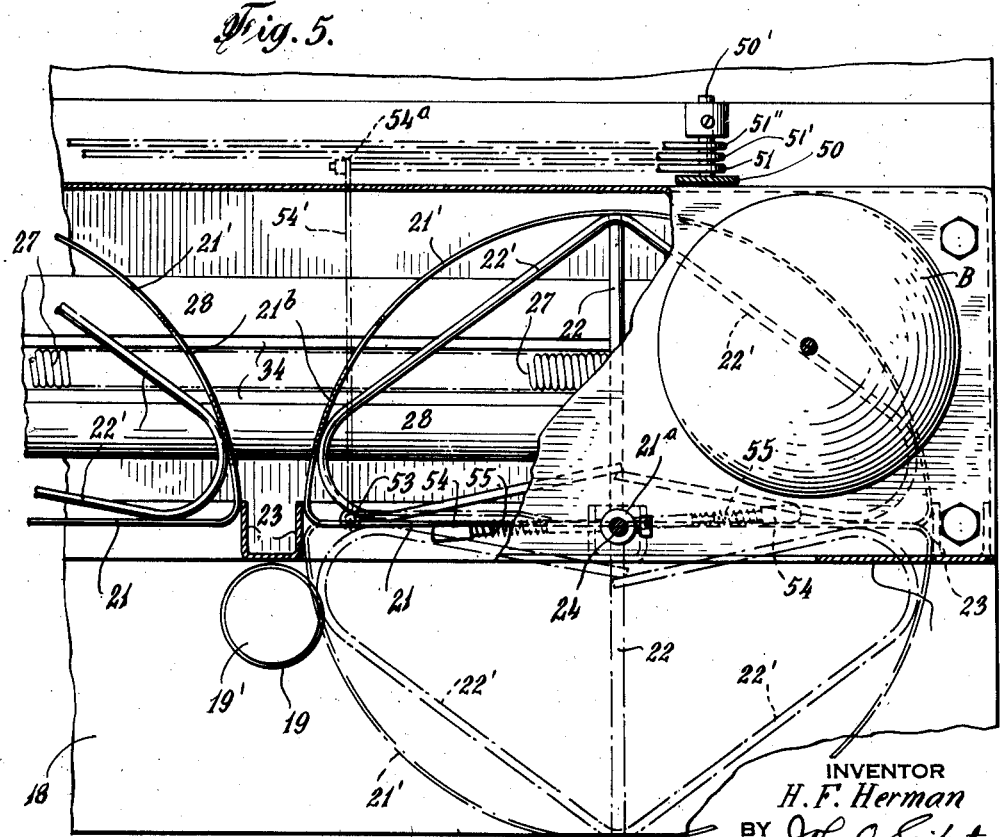
Figure 5 is a sectional view taken substantially on the line 5—5 of Figure 3.

Each carrier comprises a tubular sheet metal member of semicircular form in cross section, as shown in Figure 5, and including a flat wall or plate 21 and a circular wall or plate 21' having a diameter equal to the length of the plate 21. The carrier is provided with a support for the articles at one end and constituting the bottom of the carrier, and as shown, is formed of wire having a part 22 extending transversely of the carrier midway the ends thereof and looped portions 22' disposed at opposite sides of the member 22 and whereby said member will not obstruct the passage of steam into and through the carriers. To facilitate placing articles in and removing articles from the carrier the curved wall 21' has recesses extended into the upper end at opposite sides of the carrier, as at 21ᵇ. The carriers are pivotally mounted midway the ends thereof to swing on a vertical axis within openings in the front wall of the casing 20 and in relation to openings in an enclosing casing C, the openings being of rectangular form to correspond to and being slightly larger than the rectangular plate 21 of the carriers, the wall about the openings being flanged inwardly, as shown at 23 in Figure 7. Each carrier is pivotally supported in an opening 23 upon a portion of reduced diameter of a shaft 24 extended through a partition 25 spaced above the casing 20, the top of the casing 20 and the flange about the opening and through a tubular portion 21ª midway the rectangular plate 21 of the carrier and the carrier secured on the shaft by set screws 26. The shaft 24 is supported on the partition 25 on the shoulder formed by the reduced portion of the shaft, or upon a washer interposed between said shaft shoulder and the partition 25, and has a hand manipulating knob 24' fixed to the upper end extended through an opening in the top of the enclosing casing C, as shown in Figures 1 and 2. The article carrier may be adjusted to position in the chamber of the casing 20, as shown in Figures 5 and 7, in which position articles carried thereby are within the range of the cooking medium, or the carrier may be adjusted to the position shown in dot and dash lines exterior of the casing 20 and out of the range of the cooking medium and in which position articles are placed in or removed from the carriers. By providing the carriers with the rectangular plates 21 they will substantially close the openings in either of said positions of the carriers, and during the movement of the carriers to either one of said positions the openings are maintained substantially closed by the curved wall 21' of the carriers.

As stated, the cooking medium comprises steam produced by converting or changing the water in the container 14 into steam, which passes upwardly through the opening 18ª into the casing 20 and such carriers as may be disposed in the chamber in said casing 20 within the range of the cooking medium. For this purpose heating means is provided for the water comprising an electric heating element in the form of a coil of bare electric current resistance wire 27 buoyantly supported to extend in a plane parallelly of the surface of the liquid in the container 14 with only the lower circumferential portion of the convolutions of the coil contacted by the water. The support for the coil comprises a cylindrical float 28 supported at the opposite ends by arms 29 substantially of right angle form and the arms supported to permit of upward and downward movement of the float with the rise and fall of the level of the water in the container. For this purpose disks 30 of resilient and non-conducting material, such as rubber, are clamped to the cover plate 18 for the container 14 relative to openings therein by annular clamping members 31 secured to the plate 18 by the screws 17 securing the container upon the feet 15 and screws 17'', and the arms secured to the supporting disks 30 by threading and extending the ends of the arms through a perforation in the disks 30 and clamping the arms to the supporting disks by nuts 33, as clearly shown in Figure 7. The float carrying arms also serve as electric conductors for connecting the heating element 27 in circuit with a source of electric energy. For this purpose the ends of the arms are extended above the supporting disks 30 and binding nuts 29' for conductors are engaged thereon. The heating element 27 is carried substantially axially of the float and to mount the heating element on the float whereby only a portion thereof will engage in the water in the container and to also insulate the heating element from the float, it is carried in a U-shaped member of insulating material 34, such as porcelain, mounted in a correspondingly formed recess extended radially inward from the periphery of the float, as clearly shown in Figures 7 and 10. The float carrying arms are electrically connected to the terminals of the heating coil 27, as shown in Figure 10. The heating coil 27 is wound about a tubular core 27' of insulated material, and the ends of the float carrying arms are bent laterally and engaged in the ends of said core to maintain the heating element in position in the float. To connect and insulate the arms 29 from the float and to also insulate the arms from the water in the container, they are extended through a tube of insulating material 35 and a tubular member 35' of porcelain and whereby the arms are mounted on the float by engaging said porcelain members in a tubular portion of plates 28' of semicircular form secured to the ends of the float. It will be obvious that should the level of the liquid in the container 14 be lowered, the float will fall therewith and thus maintain the heating element with only a portion thereof engaging in and quenched by the water. By this arrangement of the heating coil as it is connected in circuit with a source of electric energy the water entering into the ends of the U-shaped member 34 of the float and contacting the lower peripheral portion of the convolutions of the heating coil is instantly changed to steam, the steam rising in said member and contacting with the portion of the heating coil out of contact with the water and then passes out of the member 34 into the chamber of the casing 20 and simultaneously commencing the cooking of the article or articles in the carriers disposed in the casing 20 within the range of such steam.

Figure 6:
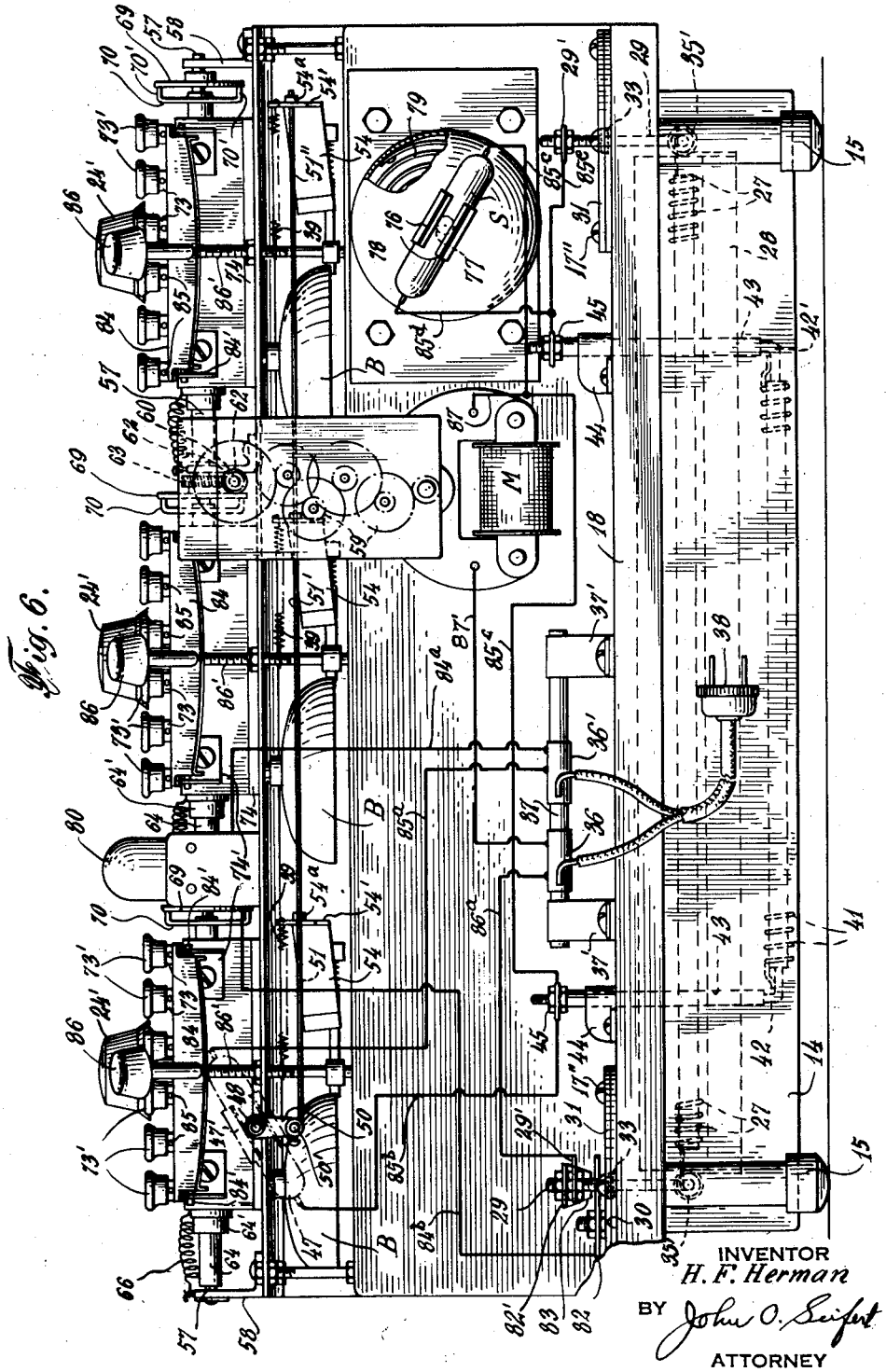
Figure 6 is an elevational view, on an enlarged scale, looking at the rear of Figure 1 with the enclosing casing removed.

The float carrying arms and thereby the heating coil 27 is connected in circuit with a source of electric energy through a pair of contact terminals in the form of sleeves of electric conducting material 36, 36' mounted on a member 37 of non-conducting material supported in brackets 37' mounted on the cover plate 18 for the container 14 (Figure 6), and said conductor sleeves 36, 36' connected in circuit with the source of electric energy by conductors leading from an electrical connection plug 38 connected to said sleeves. The sleeve 36 is electrically connected to one float carrying arm 29, and the sleeve 36' is electrically connected to one terminal of a mercury switch S the other terminal of which switch is connected to the other float carrying arm 29, the switch S being normally in circuit closing position.

An electric resistance element in the form of a coil is carried by a tubular member of non-conducting material, as at 41, and immersed in the water in the container (Figure 6), said heating element being carried by and electrically connected to conductor rods 42, 42' the ends of which rods are bent laterally and engaged in the tubular coil carrying member and the rods extended through sleeves of insulating material 43 extended through and secured in brackets 44 mounted on the cover plate 18 for the container 14 and the rods supported upon said sleeves by binding nuts 45 for an electric conductor threaded onto the rods and abutting the end of the sleeves 43. The resistance element is electrically connected in series with the heating element 27 and normally short-circuited through the switch S.

The circuit of the heating element 27 is normally open and adapted to be closed when a carrier a, b or c is adjusted to position with an article carried thereby in the casing 20 within the range of the cooking medium. For this purpose a mercury switch 47 (Figures 6 and 7) is interposed in and normally opening the circuit of said heating element. The switch is carried by a bracket 47' fixed on the end of a shaft 48 rotatable in a sleeve 48' fixed on the partition 25 and normally urged by a spring or springs 39 to circuit opening position. To actuate the switch to and retain it in circuit closing position with any one or all of the carriers a, b and c actuated to position articles carried thereby within the chamber of casing 10, a crank arm 50 (Figure 7) is fixed on the switch carrying shaft 48, said arm having a pin 50' fixed in and extending from the free end thereof to which a series of links or rods 51, 51', 51'' of different lengths (Figures 6 and 7) are connected by looping an end of the links around said crank pin and retained thereon between the crank arm and a collar 52 secured on the pin. Associated with each article carrier a, b and c is a right angle lever disposed above the casing 20. As shown in Figure 5, each lever at the angle is arranged with an eye whereby the lever is pivotally mounted on a pin, as at 53, fixed in and extending upwardly from the top of the casing at one end of the openings 23. One arm 54 of the levers extends toward the shafts 24 on which the article carriers are mounted and the other arm 54' extends transversely of the top of the casing, and said arms of the respective levers connected, as shown at 54ᵃ in Figures 5 and 6, to the links 51, 51' and 51''. An arm 55 is fixed on each shaft 24 in the plane of the lever arms 54, said arms 55 being arranged on the shaft 24 so that they will engage with the lever arm 54 when a carrier is adjusted to position an article carried thereby within the casing 20 and thereby actuate the lever 54, 54' and through the connection of the lever with a link 51, 51' or 51'' actuate the switch 47 to close the circuit of the heating element 27. The arms 55 are adapted to have movement through openings 55' in the front wall of the enclosing casing C.

The carriers a, b and c are normally urged to position with the curved plate 21' at the exterior of the casing 20 and in position to engage an article or articles therein, as shown in dot and dash lines in Figure 5, by a spring 56 coiled about the shaft 24 above the partition 25 (Figure 7), one end of the spring being fixed to the shaft and the other end secured to a fixed part, as shown at 56' in Figure 4. Means are provided to permit of adjustment of the carriers a, b and c to position with an article therein in the casing 20 against the tension of the spring 56, and to retain the carriers in said position against the action of said springs and release the carriers to permit them to be actuated by the springs 56 to position with an article carrier thereby exterior of the casing 20 after a selected predetermined interval or period of time, say after intervals of 2, 2½, 3, 3½, 4, 4½ or 5 minutes. For this purpose there is provided a rotatable shaft 57 extending substantially for the entire length of the apparatus and transversely of the shafts 24, said shaft 57 being journaled at the opposite ends and intermediate the ends in brackets 58 fixed upon the partition 25. The shaft 57 is rotated in the direction indicated by the arrow (Figure 7) by electrically operated time controlled means, comprising an electric motor, shown in a general way at M in Figure 6, connected through a clock train of gears 59 to a shaft 60 extending transversely of the shaft 57 and operatively connected thereto by a worm 62 meshing with a worm wheel 63 fixed on the shaft 57, the gear train 59 being adapted to rotate the shaft at a predetermined constant speed. A series of hollow shafts 64 (Figure 9) are loosely mounted on said shaft 57, one in relation to each of the carriers, and only the hollow shaft and its associated mechanism relative to one carrier, such as carrier a, is shown and described. This hollow shaft is normally urged in a direction opposite to the rotation of the shaft 57 to predetermined position until a pin projecting from a collar 64' fixed to the hollow shaft engages a fixed abutment, as shown at 65 in Figure 4, by a spring 66 one end of which is attached to a bracket 58 and the other end to the collar 54'. A disk 67 having a peripheral recess 67' (Figure 7) is fixed on the hollow shaft substantially midway the ends thereof and a peripheral portion of the disk is adapted to engage in a peripheral recess in a disk 68 fixed on the shaft 24 and hold said shaft against rotation when it has been rotated to adjust the carrier to position an article carried thereby in the casing 20. A disk 69, such as a clutch member, is fixed on the shaft 57 at the end of each hollow shaft, the left hand end as viewed in Figure 3, with which a clutch member fixed to the hollow shaft cooperates to couple the hollow shaft to the shaft 57 to rotate therewith, said clutch member being in the form of a plate 70 having diametrically opposite portions 70' arranged to project therefrom and to engage the face of the disk 69 to couple the hollow shaft with the shaft 57. The hollow shaft is moved longitudinally with the clutch member 70 on the shaft 57 to move said clutch member out of engagement with the clutch member 69 by the spring 66, and the hollow shaft is moved in the opposite direction against the tension of spring 66 to operatively engage the clutch member 70 with the clutch member 69 under the force of the spring 56 to rotate the shaft 24 to move a carrier to position exterior of the casing and the force exerted on the shaft 24 transmitted to longitudinal movement of the hollow shaft by the engagement of the side wall of the recess in disk 68 on the shaft 24 with a side of the peripheral portion of the disk 67 engaging in the recess of disk 68. When the disk 67 is rotated through the connection of the hollow shaft with the shaft 57, for instance, from a position as shown in Figure 7, to position to register the disk recess 67' with the recess in disk 68 the shaft 24 and thereby the carrier will be actuated under the influence of spring 56 from the position shown in said Figure 7 in the casing 20 to position exterior of the casing at which time a peripheral portion of the disk 68 will engage in the recess 67' in disk 67 and hold said disk and the hollow shaft against rotation, and as the hollow shaft is relieved of the force of the spring 56 the hollow shaft will be moved longitudinally under the influence of spring 66 and uncouple the hollow shaft from the shaft 57. Upon rotation of the shaft 24 by the knob 24' to adjust the carrier to position in the casing 20 the peripheral recess in disk 68 in said position of the carrier will register with the recess 67' in disk 67 and the hollow shaft with said disk 67 will be rotated under the influence of spring 66 causing the peripheral portion of the disk 67 to engage in the recess in disk 68 and thereby releasably retain or lock the shaft 24 in position with the carrier in the casing 20.

The motor M is connected in the circuit of the heating element 27, whereby when the circuit of said heating element is closed by the switch 47 the circuit of the motor is also closed and the circuit of said motor is opened upon the actuation of said switch to open the circuit of the heating element. In a device embodying a series of article carriers, as shown, the switch 47 is not actuated to circuit opening position until the last one of said carriers is actuated to position exterior of the casing 20.

To control the actuation of the disk 67 through the rotation thereof with the shaft 57 so as to release the disk 68 and thereby the shaft 24 carrying the carrier to permit actuation of the shaft and carrier by the spring 56 to adjust the carrier to position exterior of the casing at a 2, 2½, 3, 3½, 4, 4½ or 5 minute interval or period of time after the carrier has been adjusted to position in the casing 20, settable means are provided, comprising a series of six stop disks 71, 71', 71ᵃ, 71ᵇ, 71ᶜ and 71ᵈ, fixed on and spaced equidistantly along the hollow shaft 64 at opposite sides of the disks 67, each of said stop disks having an electric portion whereby each disk is provided with a peripheral shoulder or notch e, as shown in Figure 9, and the disks are arranged on the shaft 64 so that said shoulder of successive disks will be angularly spaced about the hollow shaft 15 degrees from preceding disks and the speed of rotation of said stop disks with the hollow shaft when coupled to the shaft 57 will be rotated through an arc of 15 degrees in a one-half minute interval and the shoulders on the stop disks are arranged in predetermined relation to the recess 67' in the disk 67.

A series of settable abutments equal in number to the disks 71 to 71ᵈ, inclusive, are provided and any one of which is adapted to be set to be engaged by a shoulder on a stop disk as the hollow shaft is rotated by the spring 66. These abutments, as shown in Figures 3, 4, 7 and 8, comprise pins 72 fixed in and extending at a right angle from stems 73 carrying manipulating finger keys or buttons 73', the stems being slidably mounted in slideways in a vertically extending portion of a right angle bracket 74 fixed on the partition 25 in the rear of the hollow shaft 64. The stems are alined with the stop disks on the hollow shaft and the pins 72 are of a length to extend substantially to the axis of the shaft 64 and adapted to be adjusted to position to extend in the path of travel of the shoulders on the stop disks, as shown in dotted lines in Figure 8, or in a plane above the disks, as shown in full lines, and retained in adjusted position by resilient spring fingers 75 slidably engaging the stems opposite a wall of the slideways. The interval of time of rotation of the hollow shaft with the disks 67 by the power shaft 57 and thereby the interval of time the article carrier is retained in the casing 20 in the range of the cooking medium is determined and controlled by the position of the stop shoulders on the disks on the hollow shaft in relation to the pins 72. The finger keys 73' are arranged in rows, one row relative to each carrier, and extend through openings in the top of the enclosing casing C so that they may be manipulated from the exterior of said casing, and have indicia thereon to indicate the interval or period of time the carrier will be retained in the casing 20 before it is released and actuated by the spring 56 to position exterior of said casing. The key at the extreme left of each row, as viewed in Figure 3, has the character "2" thereon, being representative of two minutes, and the successive keys have characters "2½," "3," "3½," "4," and "4½" thereon and representative of periods of time.

For instance, should the third key with the character 3 thereon be depressed the cooking period upon depressing said key will be three minutes, and if the last key is depressed the cooking period will be 4½ minutes.

To restore a depressed finger key to normal position, a plate 84 is pivotally supported at the opposite ends to rock on its longitudinal center, as at 84', on brackets 74' fixed to and extending rearwardly from the vertical portion of bracket 74, a longitudinal marginal portion of the plate disposed below pins 85 fixed in and extending from the stems in a direction opposite to the pins 72. When a key stem is depressed the plate is rocked to one side by the engagement of the stem pin 85 therewith and is retained in such position by the stem. To restore the key stem to its normal position, a stem carrying a knob, as at 86, is fixed to and extends upwardly from the plate 84 at the side of its pivot support opposite the side disposed below the stem pins 85, said knob extending through an opening in the top of the enclosing casing whereby it may be readily depressed to rock the plate 84 to move a depressed key stem to initial position, the depressing movement of the plate being limited by engaging a stop 86', as shown in Figure 7.

The setting means is normally in position with the recess 67' in disk 67 on the hollow shaft in alinement with and the disk 68 on the shaft 24 engaging therein. Assuming it is desired to cook an egg or other article three minutes. The key 73' with the numeral 3 thereon, the third from the left of the row, as viewed in Figures 3 and 4, is depressed, thereby positioning the abutment 72 carried by the stem of said key in the path of movement of the shoulder on third stop disk 71ᵃ on the hollow shaft 64. Assuming an article is to be cooked in only one of the carriers, as the carrier a. The article is placed in said carrier and the carrier shaft 24 rotated by the knob 24' and as the carrier is adjusted to position in the casing 20 the recess in the disk 68 on shaft 24 will register with the recess in disk 67, thereby releasing the disk 67 and hollow shaft and permitting said shaft to be actuated by the spring 66, said spring rotating the hollow shaft until the shoulder on stop disk 71ᵃ engages the abutment 72 set in the path of movement thereof and thereby stopping the rotation of the hollow shaft 64. Simultaneously with the engagement of the peripheral portion of the disk 67 in the recess in disk 68, the spring 56 having been placed under tension by the rotation of the shaft 24, the expansion forces of said spring on the shaft acts to rotate said shaft in reverse direction and causes the side wall of the recess in disk 68 to engage with and transmit said forces to disk 67 and thereby exert a force on the hollow shaft to move it longitudinally and engage the clutch member 70 with the clutch member 69 on the power shaft 57 and coupling said shaft to the hollow shaft. The rotation of the power shaft then causes the hollow shaft 64 to rotate therewith until the recess in the disk 67 registers with the recess in disk 68 on the shaft 24, requiring an interval or period of time of three minutes, and permitting said disk 68 to move in the recess in disk 67 under the influence of spring 56 and thereby moving the carrier to the exterior of the chamber in casing 20. Simultaneously with the adjustment of the carrier to position in the casing 20 by the knob 24', the arm 55 mounted on the carrier shaft 24 engages the lever arm 54, thereby rocking said lever and through the connection of the other lever arm 54' with link 51 actuates the mercury switch 47 to close the circuit of the heating element 27 and the motor M. The arm 55 is moved away from the lever arm 54 and releases the lever 54, 54' when the carrier is adjusted to position exterior of the casing thereby permitting the mercury switch 47 to be actuated to circuit opening position by its actuating spring 39.

Assuming articles in all three of the carriers are to be cooked simultaneously, the article in carrier c to be cooked for three minutes, the article in carrier b two minutes, and the article in carrier a four minutes. The third key 73' having the numeral "3" thereon in the row of keys relative to the carrier c is depressed, the first key having the character "2" thereon in the row relative to the carrier b is depressed, and the fourth key having the character "4" thereon in the row relative to carrier a is depressed. The carriers with the articles therein are then adjusted to position the carriers in the casing 20 within the range of the cooking medium, this adjustment of the carriers actuating the mercury switch 47 to close the circuit of the heating element 27 and motor, and the carriers are releasably retained in said positions by a peripheral portion of the disks 67 engaging the recess in the disks 68 on shaft 24. After an interval of two minutes the carrier b is released, permitting the shaft 24 associated with the carrier b to be actuated by spring 56 to move the carrier b to position exterior of the casing 20. At the termination of a three minute interval after the carrier c has been adjusted to position in the casing 20 said carrier is released, and the carrier a is released after an interval of four minutes, and as the latter carrier a is moved to said position the arm 55 is moved away from lever arm 54 and permitting the mercury switch 47 to be actuated by a spring 39 to circuit opening position. Should none of the keys 73' be depressed and no abutment 72 be positioned in the path of movement of a stop disk on a hollow shaft 66, as the disk 67 is released from the disk 68 on a shaft 24 by rotation of said shaft to position a carrier within the casing 20, the hollow shaft with the disk 67 will be rotated by spring 66 until the pin in the collar 64' engages the stop 65. In this position of the parts as the hollow shaft is coupled to and rotated by the drive shaft 57 it will take an interval or period of time of five minutes to rotate the shaft 64 to position the recess 67' in the disk 67 in register with recess in disk 68 to release said disk 68 and shaft 24 to permit the spring 56 to rotate said shaft to position the carrier at the exterior of the casing 20 and thus cooking an article in the carrier for five minutes.

A bell B is disposed above the casing relative to each carrier a, b and c, to which the arm 55 serving to actuate the levers 54, 54' to actuate the switch to circuit closing position, functions as a bell striker to ring a bell when a carrier is moved to position at the exterior of the casing 20, as shown in dotted lines at the right in Figure 5.

It is possible that the steam may be raised to so high a temperature as to interfere with the proper cooking of the article, or in the case of cooking an egg or eggs cause them to break. Therefore, means are provided to connect the resistance element 41 in series with and reduce the heating of steam generating coil 27 and generation of steam. For this purpose the mercury switch S is mounted in a carrier 76 fixed on a shaft 77 rotatably mounted axially of a dome shaped housing 78 mounted on and opening through the rear wall of the chamber to the casing 20. A temperature responsive member, such as a bi-metallic coil 79 having different coefficients of expansion, is arranged in the housing 78 with one end attached to the shaft 77 and the other end attached to the housing 78. When the steam is below a predetermined temperature the temperature responsive member will assume its normal position with the switch S in circuit closing position, causing the current to flow through the switch and coil 27. However, when the steam rises above such predetermined temperature the temperature responsive member 79 will rotate the shaft 77 and with it the switch S to move it to circuit opening position and causing the current to flow through resistance element 41 in series with the heating coil 27.

There is a possibility that sufficient water may evaporate so that the level of the water in the container 14 will be so low that the heating element 27 will not contact the water, with the result that there will be no steam generated and it may be possible that the coil may be burned out or there may be other injury to the device. For this purpose signalling means is provided which is rendered active when the heating element carrying float is lowered to a predetermined point. As shown, said means comprises an electric lamp 80 mounted in a socket member 81 fixed on a member 25' mounted on and extending perpendicular to the partition 25, and the lamp projecting through an opening in the top of the enclosing casing C. The socket member 81 is electrically connected to the terminal sleeve 36' by conductor 84. The other terminal of the lamp contacts a contact terminal 82, electrically connected by conductor 84' to a contact terminal 82' mounted on and insulated from the cover plate 18 for the container 14 in line with the mounting of a float supporting arm 29, and with which terminal 82' a circuit maker 83 (Figure 7) is adapted to contact to close the lamp circuit. The circuit maker 83 is mounted on and in electric connection with a float carrying arm 29 normally out of contact with the contact terminal 82' when the float is buoyantly supported by the water in the container 14 and adapted to contact the contact terminal 82' and close the circuit of lamp 80 when the water is lowered below a predetermined level in container 14 and the float is lowered sufficiently so that the coil 27 is not in contact with the water, the lighting of the lamp indicating that there is not sufficient water in the container 14.

The electrical connections of the parts are shown in a diagrammatic manner in Figure 12. In the normal position of the apparatus the terminals 36, 36' adapted for electrical connection with a source of electric energy as hereinbefore set forth are represented as being connected to the negative and positive sides of the electric circuit, respectively. A conductor $85^a$ connected to the terminal 36' is connected to one terminal of the switch 47 and a conductor $85^b$ connected to the other terminal of said switch 47 is connected to one terminal of the resistance element 41. A branch conductor $85^c$ leading from the conductor $85^b$ is connected to one side of the switch S normally in circuit closing position, and the other terminal of said switch is connected by conductor $85^d$ to the terminal of the resistance element 41 opposite to which the conductor $85^b$ is connected, and connected by conductor $85^e$ to one terminal of the heating element 27 through a supporting arm 29 therefor, the other terminal of said heating element 27 being connected through the other supporting arm 29 therefor to the terminal sleeve 36 by conductor $86^a$. The resistance element 41 is connected in series with the heating element 27 and is normally short circuited and cut out of the circuit when the switch S is in circuit closing position, and when said switch S is actuated by the temperature responsive element 79 to open the branch circuit $85^c$, $85^d$, the resistance element 41 is connected in circuit with the conductors $85^b$, $85^e$, causing the current to flow through said resistance element and correspondingly reducing the current flow through the element 27 and a reduction in the steam generated by said heating element, the resistance element 41 heating the water in the container 14, and when said resistance element 41 is short circuited by the closing of the circuit through switch S facilitating the generation of steam by the heating element 27. The lamp 80 is connected in circuit with the terminals 36, 36' by connecting conductor $84^a$ connected to one terminal of the lamp and the conductor $85^a$, and conductor $84^b$ connected to the other terminal of the lamp being connected to the contact terminal 82' and the circuit maker 83 normally out of contact with contact terminal 82' adapted to be placed in contact therewith is mounted on and in electrical connection with a supporting arm 29 for the heating element 27 to which the conductor $86^a$ is connected. The motor M is connected in the circuit of switch 47 by conductors 87, 87', the conductor 87 being connected to the conductor $85^a$ connected to one side of the switch, and the conductor 87' connected to the conductor $85^b$ connected to the opposite side of the switch to the conductor $86^a$ and whereby the circuit of said motor is closed when the circuit is closed through the switch 47.

Various modifications may be made in the construction and arrangement of the parts without departing from the scope of the invention.

Having described my invention, I claim:

1. In a steam generating device, a container carrying liquid therein, a heating coil of bare electric resistance wire adapted to be connected in circuit with a source of electric energy, and a float supported by the liquid in the container carrying and positioning the heating coil with a peripheral portion of the convolutions thereof quenched by liquid in the container and transforming the quenching liquid into steam.

2. In a steam generating device, a container having an opening at the top and carrying liquid therein, a heating coil of bare electric resistance wire adapted to be connected in circuit with a source of electric energy, a float carrying the heating coil buoyantly supported by the liquid in the container and arranged to position the heating coil to extend in a plane parallelly of the surface of the liquid with a lower peripheral portion of the heating coil contacted and quenched by a portion of the liquid and transforming said coil quenching liquid into steam.

3. In a steam generating device, a liquid carrying container, a heating coil connected in circuit with a source of electric energy, means buoyantly supported by the liquid in the container carrying the heating coil arranged to position the heating coil to extend in a plane parallelly of the surface of the liquid and cause only a portion of the liquid to contact and quench the lower peripheral portion of the heating coil and transform said liquid into steam, and means for regulating the generating of the steam comprising a second electric heating coil immersed in the liquid in the container connected in the circuit of the first heating coil, a switch connected in the circuit of said heating coils adapted in the circuit closing position thereof to short said second heating coil and in the circuit opening position of said switch connect said second heating coil in series with the first heating coil, and a temperature responsive member controlled by the temperature of the generated steam normally actuating the switch to circuit closing position and short circuiting the second heating coil when the generated steam is below a predetermined temperature and rendered active when the temperature of the generated steam rises to said predetermined temperature to actuate the switch to circuit opening position and connect the second heating coil in series with the first heating coil.

4. In a steam generating device as claimed in claim 3, means having a chamber therein in communication with the top of and adapted to receive steam from the container, and wherein the temperature responsive member rendered active to actuate the switch comprises a bi-metallic coil exposed to the steam in said chamber.

5. In a steam generating device, a container carrying a liquid therein, a float buoyantly supported by the liquid in the container comprising an elongated hollow cylindrical body having a recess extended radially inward from the periphery and opening through the opposite ends of the body, a heating coil of bare electric resistance wire connected in circuit with a source of electric energy extending longitudinally of and supported on the bottom of the float recess, and means to support the float with the opening of the recess in the side of the body uppermost and permit the float to rise and fall with the level of the liquid in the container and position the float to adapt the liquid from the container to enter the ends of the float recess and quench the lower peripheral portion of the convolutions of the heating coil and transform said liquid into steam.

6. A steam generating device as claimed in claim 3, wherein the means buoyantly supported by the liquid in the container carrying the first mentioned heating coil and positioning said heating coil to extend in a plane parallel of the surface of the liquid and cause only a portion of the liquid to contact and quench the lower peripheral portion of said heating coil, comprises an elongated hollow cylindrical body having a recess extended radially inward from the periphery and of a depth slightly greater than the radius of the body and opening through the opposite ends of the body, and in which recess said first mentioned heating coil is supported and extends longitudinally thereof, and means to support said body with the opening of the recess in the periphery of the body uppermost and permit said body to raise and fall with the level of the liquid in the container.

7. In a steam generating device, a liquid carrying container, a float comprising a hollow cylindrical body having a recess extended radially inward from the periphery and opening through the opposite ends of the body, a coil of bare electric resistance material connected in circuit with a source of electric energy supported in the bottom portion of and extending longitudinally of the float recess and said float buoyantly supported by the liquid in the container with the recess opening through the peripheral wall uppermost and the lower portion of the open ends in communication with and permitting the liquid from the container to flow into the float recess and transformed into steam by contacting with and quenching the lower portion of the heating coil and the generated steam rising in the float recess relative to the unquenched portion of the coil.

8. In a steam generating device, a liquid carrying container, a float buoyantly supported by the liquid in the container including a hollow cylindrical body having a recess of U-shape in cross section extended radially inward from the periphery to a point beyond the axis of the float body and opening through the opposite ends of the body, a U-shaped member of insulating material engaged in the float recess, a coil of bare electric resistance material, a core of insulating material upon which the coil is wound engaged in and supporting the coil in the bottom portion of the U-shaped member in the float recess, arms of electric conducting material connecting the coil in circuit with a source of electric energy and supporting the float to rise and fall with the level of the liquid in the container and positioning the float with the peripheral portion through which the U-shaped member opens uppermost and permit liquid from the container to enter the ends of the U-shaped member and transformed into steam by contact of said liquid with and partially quenching the coil.

HENRY F. HERMAN.